(12) United States Patent
Dai et al.

(10) Patent No.: US 10,118,245 B2
(45) Date of Patent: Nov. 6, 2018

(54) SACRIFICIAL RESISTANCE WELD ELECTRODE

(71) Applicant: Greatbatch Ltd., Clarence, NY (US)

(72) Inventors: Xiangyang Dai, East Amherst, NY (US); Robert D. Miller, Lancaster, NY (US)

(73) Assignee: Greatbatch Ltd., Clarence, NY (US)

( * ) Notice: Subject to any disclaimer, the term of this patent is extended or adjusted under 35 U.S.C. 154(b) by 430 days.

(21) Appl. No.: 14/513,295

(22) Filed: Oct. 14, 2014

(65) Prior Publication Data
US 2015/0174694 A1    Jun. 25, 2015

Related U.S. Application Data

(60) Provisional application No. 61/889,603, filed on Oct. 11, 2013.

(51) Int. Cl.
| | |
|---|---|
| *B23K 11/30* | (2006.01) |
| *B23K 11/20* | (2006.01) |
| *B23K 11/00* | (2006.01) |
| *B23K 101/32* | (2006.01) |
| *B23K 101/36* | (2006.01) |
| *B23K 103/10* | (2006.01) |

(Continued)

(52) U.S. Cl.
CPC ........ *B23K 11/3009* (2013.01); *B23K 11/004* (2013.01); *B23K 11/20* (2013.01); *B23K 2201/32* (2013.01); *B23K 2201/36* (2013.01); *B23K 2203/05* (2015.10); *B23K 2203/08* (2013.01); *B23K 2203/10* (2013.01); *B23K 2203/14* (2013.01); *B23K 2203/18* (2013.01); *B23K 2203/26* (2015.10)

(58) Field of Classification Search
CPC ....................................................... B23K 11/30
USPC ..................................... 219/119, 91.22, 91.2
See application file for complete search history.

(56) References Cited

U.S. PATENT DOCUMENTS 3,665,145 A * 5/1972 Engel ................. B23K 35/0205
                                                        219/118
3,666,910 A * 5/1972 Anderson .......... B23K 11/0053
                                                        219/107

(Continued)

FOREIGN PATENT DOCUMENTS

| EP | 0532312 | 3/1993 |
|---|---|---|
| EP | 1282178 | 2/2003 |

(Continued)

OTHER PUBLICATIONS

EPSearch, "10192075", EP2325928, dated Jun. 16, 2011, 1-4.

*Primary Examiner* — Dana Ross
*Assistant Examiner* — Ayub Maye
(74) *Attorney, Agent, or Firm* — Michael F. Scalise; Steven W. Winn

(57) ABSTRACT

An electrode used for resistance welding is described. In an embodiment, the electrode comprises a two-part construction having an electrode tip portion that is removably contactable to an electrode base. The electrode is constructed such that the respective base and electrode tip portions may be composed of metals having differing melting temperatures, in particular a significant difference in melting temperature of at least 100° C. or more. The electrode is preferably constructed so that the electrode tip portion can be easily removed, thereby leaving the base portion within the fixture.

15 Claims, 6 Drawing Sheets

(51) Int. Cl.
  *B23K 103/18* (2006.01)
  *B23K 103/08* (2006.01)
  *B23K 103/14* (2006.01)
  *B23K 103/04* (2006.01)

(56) References Cited

U.S. PATENT DOCUMENTS

| | | | |
|---|---|---|---|
| 3,909,581 A * | 9/1975 | Stone | B23K 11/3009 219/119 |
| 3,912,900 A * | 10/1975 | Arnett | B23K 11/0026 219/119 |
| 4,194,107 A * | 3/1980 | Klasson | B23K 9/167 219/145.1 |
| 4,214,142 A * | 7/1980 | Crosby | B23K 11/3009 219/119 |
| 4,252,263 A | 2/1981 | Houston | |
| 4,400,608 A * | 8/1983 | Wagatsuma | B23K 35/0205 219/107 |
| 4,514,612 A * | 4/1985 | Nied | B23K 11/3009 219/119 |
| 4,761,355 A | 8/1988 | Skarstad et al. | |
| 4,865,932 A | 9/1989 | Masuda et al. | |
| 4,910,376 A * | 3/1990 | Riley | B23K 35/0205 219/119 |
| 4,947,019 A * | 8/1990 | Akiyama | B23K 11/3009 219/119 |
| 5,066,845 A * | 11/1991 | Anderson | B23K 9/123 219/117.1 |
| 5,126,527 A * | 6/1992 | Haehner | B23K 1/0004 219/85.15 |
| 5,202,601 A * | 4/1993 | Takamura | H01T 13/39 313/11.5 |
| 5,250,373 A | 10/1993 | Muffoletto et al. | |
| 5,304,769 A * | 4/1994 | Ikegami | B23K 35/0205 219/119 |
| 5,332,342 A * | 7/1994 | Kizaki | B23B 5/166 219/119 |
| 5,354,629 A | 10/1994 | Kuroda et al. | |
| 5,406,166 A * | 4/1995 | Abe | H01T 21/02 123/169 EL |
| 5,571,146 A | 11/1996 | Jones et al. | |
| 5,739,496 A * | 4/1998 | Asakura | H01R 43/0214 219/119 |
| 5,750,286 A | 5/1998 | Paulot et al. | |
| 5,786,559 A | 7/1998 | Ottino et al. | |
| 6,011,237 A * | 1/2000 | Yang | B23K 11/3018 219/119 |
| 6,503,640 B2 | 1/2003 | Wittebrood et al. | |
| 6,762,391 B2 * | 7/2004 | Wile | B23K 11/3081 219/119 |
| 6,929,881 B2 | 8/2005 | Wutz et al. | |
| 7,022,934 B1 * | 4/2006 | Pratt | B23K 11/314 219/119 |
| 7,081,142 B1 | 7/2006 | Carlson | |
| 7,108,942 B1 | 9/2006 | Gan et al. | |
| 7,341,802 B1 | 3/2008 | Ota et al. | |
| 7,381,923 B2 * | 6/2008 | Gordon | B23K 9/123 219/137.61 |
| 7,539,007 B2 | 5/2009 | Zhao et al. | |
| 7,622,219 B2 | 11/2009 | Ota et al. | |
| 8,785,807 B2 * | 7/2014 | Vanimisetti | B23K 11/3018 219/117.1 |
| 2001/0003863 A1 | 6/2001 | Thibault et al. | |
| 2004/0016723 A1 * | 1/2004 | Rohner | B23K 11/312 219/86.8 |
| 2004/0038070 A1 | 2/2004 | Dockus et al. | |
| 2006/0237396 A1 * | 10/2006 | Buday | B23K 11/30 219/119 |
| 2007/0037054 A1 | 2/2007 | Kikuchi et al. | |
| 2009/0159570 A1 * | 6/2009 | Chen | B23K 11/0053 219/119 |
| 2013/0105046 A1 * | 5/2013 | Carlson | B23K 11/11 148/526 |

FOREIGN PATENT DOCUMENTS

| | | |
|---|---|---|
| EP | 1791198 | 5/2007 |
| EP | 1876668 | 1/2008 |
| EP | 2083462 | 7/2009 |
| EP | 2317589 | 5/2011 |
| EP | 2325928 | 5/2011 |
| JP | 07323378 A * | 12/1995 |
| JP | 08174228 A * | 7/1996 |

* cited by examiner

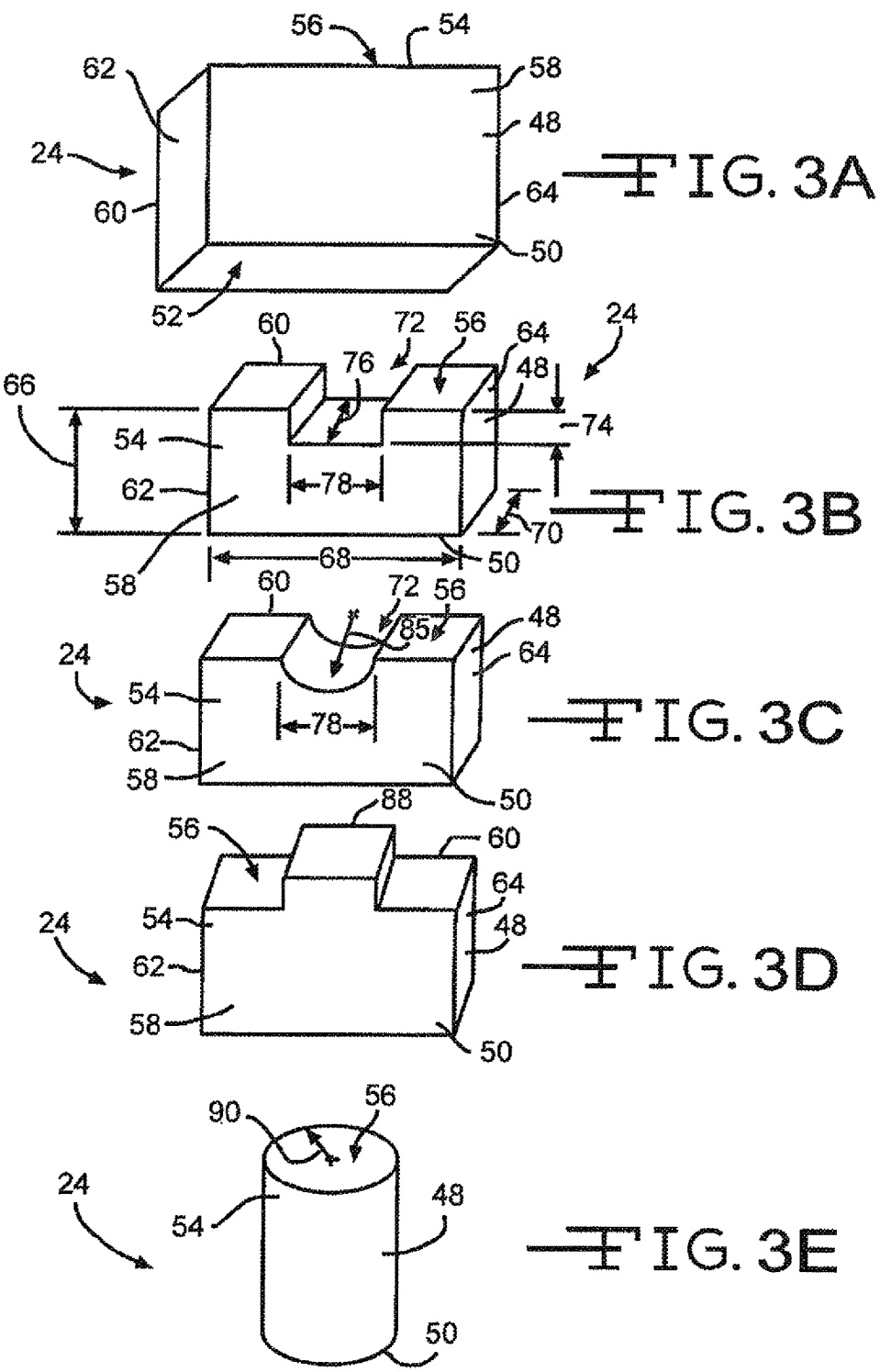

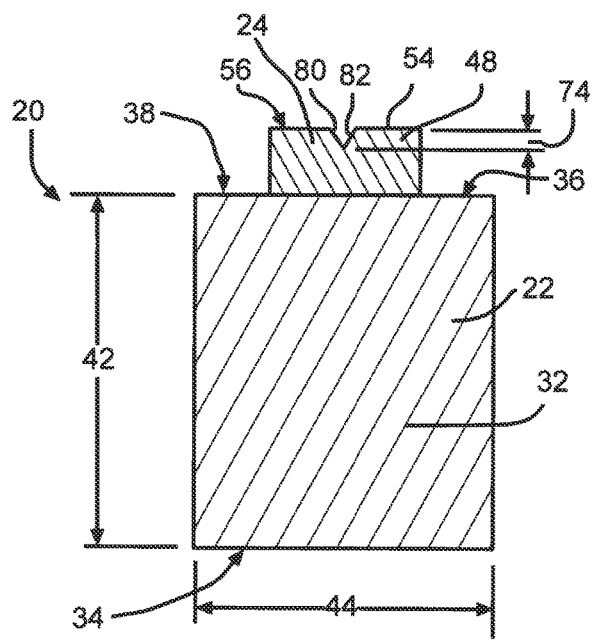
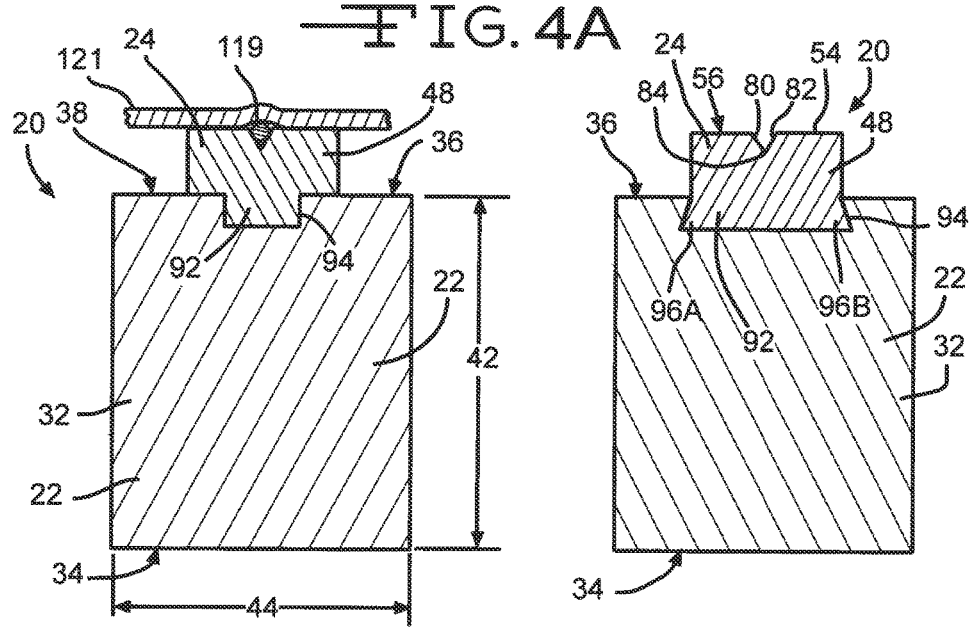

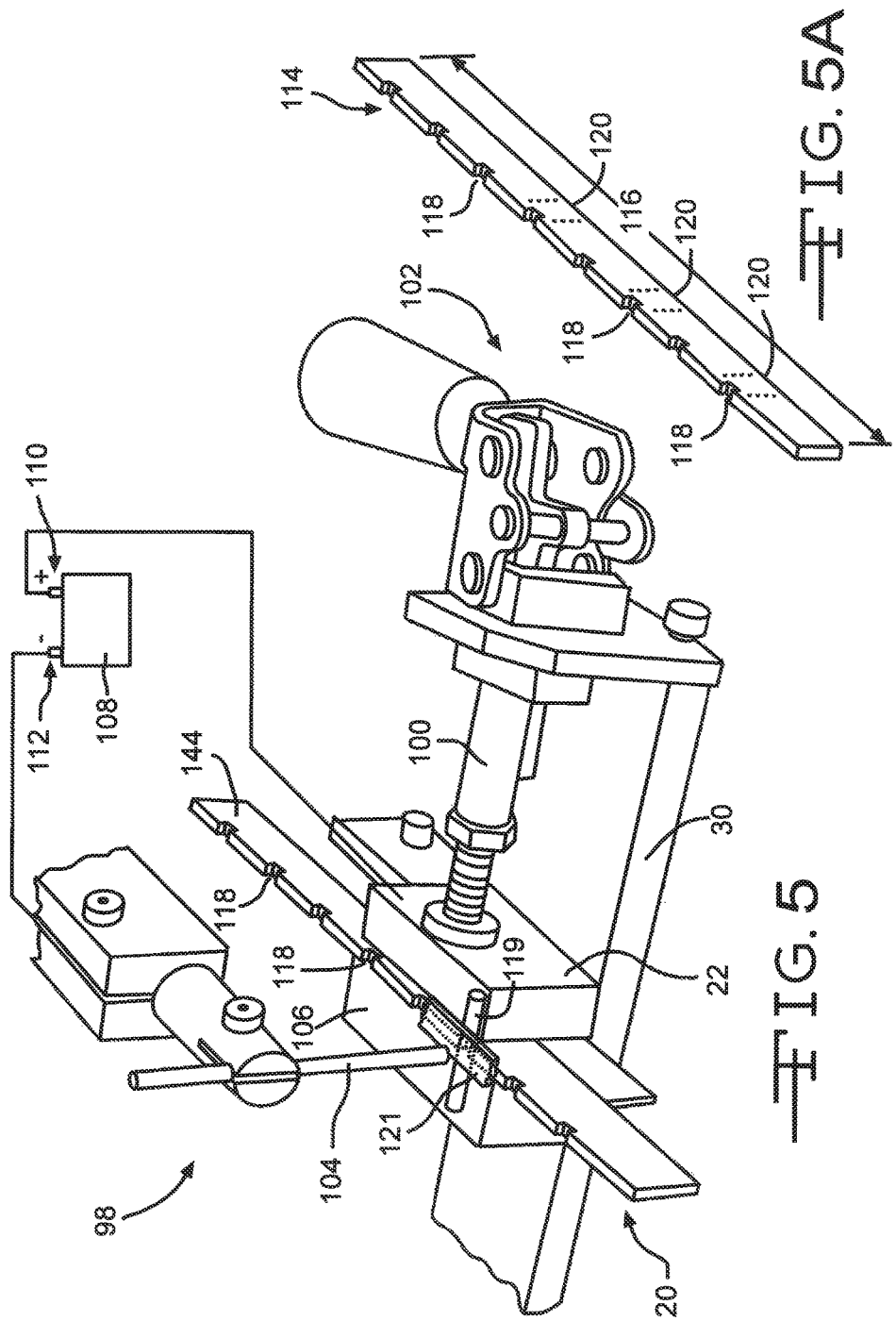

SACRIFICIAL RESISTANCE WELD ELECTRODE

CROSS-REFERENCE TO RELATED APPLICATION

This application claims priority from U.S. Provisional Patent Application Ser. No. 61/889,603 filed Oct. 11, 2013.

FIELD OF THE INVENTION

The present invention relates to the art of resistance welding. More specifically, the present invention is of a resistance welding electrode having a detachable welding electrode tip.

PRIOR ART

The recent rapid development in small-sized electronic devices having various shape and size requirements requires comparably small-sized electrochemical cells of different designs that can be easily manufactured and used in these electronic devices. Preferably, the electrochemical cell has a high energy density, and one commonly used cell configuration is a prismatic, case-negative cell design having an intermediate cathode flanked by opposed anode components in contact with the casing and in electrical association with the cathode.

The diverse variety of materials used in the construction of electrochemical cells increases the difficulty of assembling and manufacturing such small intricate devices. It is desirable to build such electrochemical cells with simplified procedures that create an electrochemical cell with a durable and robust construction. Such electrochemical cells require joining various internal components, composed of differing materials, with a strong durable bond. One of these critical connections is that of the terminal pin to the current collector. The terminal pin connects the electrochemical cell's internal current collector to a load such as an implantable medical device. U.S. patent application Ser. No. 12/944,859, now U.S. Pat. No. 8,722,238, U.S. Ser. No. 13/867,178, U.S. patent application publications 2014/0245600, 2014/0246408 all to Dai et al., and U.S. patent application publication 2012/0282519 to Freitag et al., all assigned to the assignee of the present invention and incorporated by reference herein, disclose various embodiments and techniques of welding dissimilar metals for incorporation into an electrochemical cell.

One such welding technique used to join materials, including metals having dissimilar melting temperatures, is that of resistance welding in which electrical energy is used to generate heat through opposed electrodes that heat and subsequently fuse materials together. However, because of the diverse materials with their respective distinct material properties, since one of the components being joined may have a relatively high melting temperature compared to the other, it is sometimes difficult to join and reliably bond such components together. In the case of joining materials with one component having a relatively high melting temperature, an increased amount of electrical energy is generally used to increase the amount of resistive heat used to melt the workpiece.

Specifically with respect to an electrochemical cell, an increased amount of electrical energy is generally required to join the terminal pin, typically composed of molybdenum, to that of the current collector, typically composed of aluminum or titanium. In this case, an increased amount of energy is required to heat the molybdenum and thus enable a weld joint therebetween. However, generating such an increased amount of energy to heat the molybdenum terminal pin material generally causes-excessive wear of the welding electrode and may even cause a portion of the electrode to melt and spall off.

Resistance welding has typically relied upon traditional copper electrodes 10, 12 having a "uni-body" construction such as those illustrated in FIGS. 1A and 1B. As illustrated, the tip and body portions of the electrode are of a single uniform construction. The use of such uni-body copper electrodes is generally not ideal when welding materials having at least one material that has a significantly increased melting temperature requiring a large amount of energy and heat to join together with another lower melting temperature material. In particular, when welding high melting temperature refractory materials, like molybdenum, the high intensity heat that is generated during the welding process may cause at least a portion of the copper electrode tip to melt. In some cases, the melted portion of the electrode may spall off from the electrode tip and/or splatter onto the weld area. Such melting and splattering of the electrode tip may therefore leave a residual amount of the electrode material, e.g. copper, on the surface of the workpiece. This residual electrode material may therefore not only cause possible cosmetic defects of the weld and surrounding area, but also may negatively affect the strength and durability of the resultant weld joint. In addition, such residual electrode materials, such as copper, may adversely affect the chemistry of an electrochemical cell and, thus, potentially negatively affect the performance of the cell. Therefore, the use of traditional electrodes, such as copper welding electrodes having a uni-body construction, is generally not ideal for welding two materials, one with a significantly higher melting temperature than the other.

Furthermore, when traditional electrodes of a uni-body construction become worn, the entire electrode must be replaced. This replacement of the whole electrode results not only in increased welding costs, but also increased operational down-time as the manufacturing process is generally halted to allow for the installation and alignment of a new electrode.

The present invention thus provides an improved resistance welding electrode design having a two-part construction. More specifically, the present invention provides a resistance welding electrode having an electrode tip portion that is detachable from an electrode base. Therefore, a welding electrode may now be provided that is configured to more suitably match the melting temperatures and/or the material composition of the workpieces, i.e., the materials to be welded, to thus minimize electrode wear and spalling. In addition, the two-part construction of the welding electrode of the present invention allows for relatively quick and easy replacement of the electrode tip (the portion that contacts the workpiece) without the added cost and down-time associated with replacement of the entire welding electrode.

For example, the base may be constructed of a highly electrical and thermal conductive material, such as copper and the electrode tip portion may be constructed from a material with a melting temperature that is similar or greater than the melting temperature of the workpiece. In addition, the electrode tip portion may be composed of a material composition that is the same or similar to the workpiece. Thus, excessive electrode tip wear and splatter contamination that may result from a melted electrode tip is minimized.

Furthermore, use of the electrode of the present invention results in minimized welding operational costs. First, the electrode tip of the present invention, with its customized materials of construction, is more wear resistant than traditional electrodes. Second, by providing a detachable electrode tip portion, the tip can easily be replaced, as opposed to replacing the whole electrode when the tip becomes worn through normal use. Thus, the design of the resistance welding electrode of the present invention decreases welding set up time, decreases operating down-time and reduces overall welding costs.

SUMMARY OF THE INVENTION

The present invention, therefore, provides an improved resistance welding electrode having a two-part construction. More specifically, the present invention provides a resistance welding electrode having an electrode tip portion that is detachable from an electrode base portion.

The respective electrode tip and base portions may be constructed of a wide range of differing geometrical shapes and materials. Thus, a resistance welding electrode could be custom tailored in both shape and material to weld and join a wide range of differing materials having differing melting temperatures.

In an embodiment, the resistance electrode of the present invention may be constructed such that the electrode tip portion is placed in removable physical contact with an exterior surface of the electrode base portion such that electrical energy readily transfers therebetween. In a more preferred embodiment, the resistance electrode of the present invention may be constructed such that the electrode tip portion interlocks with the respective base portion. In either case, the electrode tip is designed such that it can be easily removed from the base.

In an embodiment, the electrode tip portion may be constructed having a groove that preferably resides at least partially within an electrode tip distal end surface. The electrode tip groove, which may be constructed having a plurality of cross sectional geometrical shapes, helps hold the workpiece in place during the welding process. In addition, the electrode tip groove helps concentrate electrical and thermal energy to the workpiece.

Thus, the present invention overcomes many inherent difficulties that are associated with welding dissimilar materials. In particular, the present invention enables the creation of a resistance weld between two materials having a wide difference in melting temperatures. In particular, the present invention overcomes many inherent difficulties in the construction of electrochemical cells by facilitating a resistance weld connection between the terminal pin and a wide variety of metals used for the current collector and having differing melting temperatures. Thus, by providing a resistance electrode of a two-part construction, manufacturing cost and manufacturing down-time is reduced as only the electrode tip portion is required to be replaced. Furthermore, the present invention enables the utilization of different cell chemistries that may require the joining of different metals having an increased difference in melting temperatures that would otherwise not be possible with a traditional electrode of a uni-body construction.

BRIEF DESCRIPTION OF THE DRAWINGS

FIGS. 3A-3E illustrates various embodiments of electrode tip portions that may be incorporated with the resistance weld electrode of the present invention.

FIGS. 4A-4C are cross-sectional views showing various embodiments in which the welding electrode base and tip portions may be connected.

FIG. 5 shows an embodiment of a resistance welding setup and fixture utilizing the resistance welding electrode of the present invention.

FIG. 5A illustrates an alternate embodiment of an electrode tip portion that may be used with the resistance welding electrode of the present invention.

DETAILED DESCRIPTION OF THE PREFERRED EMBODIMENTS

Figure 2A:
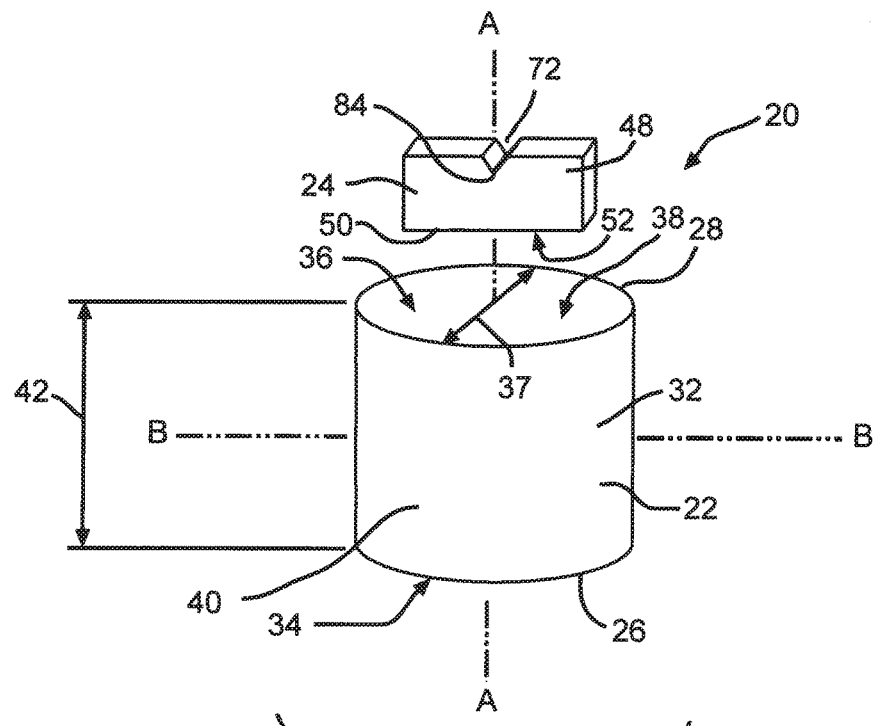
FIGS. 2A and 2B show an embodiment of the resistance welding electrode of the present invention.
Figure 2B:
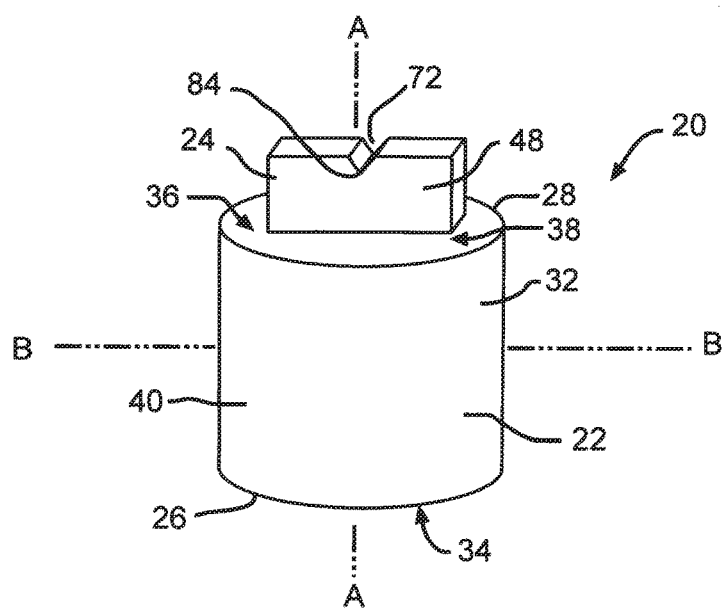

Referring now to FIGS. 2A and 2B, there is shown an embodiment of a resistance welding electrode 20 of the present invention. As shown, the electrode 20 comprises an electrode base portion 22 and an electrode tip portion 24 that extends outwardly from the base 22. In a preferred embodiment, the electrode tip portion 24 is physically contactable to the base 22 such that when the tip 24 and the base 22 are in contact with each other, electrical and thermal energy is readily transferable therebetween.

The base portion 22 preferably comprises an electrically and thermally conductive body having a base proximal end 26 that extends along longitudinal axis A-A to a base distal end 28. The base proximal end 26 is preferably configured to be received within an electrode welding fixture 30 (FIGS. 5 and 6) and the base distal end 28 is configured to contact the electrode tip portion 24. As illustrated, a lateral axis B-B is shown that extends in a perpendicular relationship to longitudinal axis A-A.

More specifically, the electrode base portion 22 comprises an electrode base body 32 that extends along longitudinal axis A-A from the electrode base proximal end 26 having an electrode base proximal end surface 34 to the electrode base distal end 28 having an electrode base distal end surface 36. The electrode base distal end surface 36 defines a base distal end surface area 38. In a preferred embodiment, the respective electrode base proximal and distal end surfaces 34, 36 may extend perpendicularly with respect to longitudinal axis A-A. However, it is contemplated that either or both of the electrode tip proximal and distal end surfaces 34, 36 may be oriented at an angular relationship with respect to longitudinal axis A-A. For example, either of the surfaces may be oriented from about 50 to about 60° with respect to axis A-A.

In a preferred embodiment, as illustrated in FIGS. 2A and 2B, the base portion 22 may be constructed in the form of a cylinder. In the embodiment, the base body 32 comprises a curved exterior base sidewall 40 that extends lengthwise along longitudinal axis A-A. The base proximal and distal ends 26, 28 respectively comprise a curved base portion diameter 37 that extends perpendicular to longitudinal axis A-A. In a preferred embodiment, the base portion diameter 37 may range from about 1 mm to about 100 mm.

Alternatively, the base body 32 may be constructed in a variety of non-limiting shapes and sizes. For example, the base body 32 may be constructed in the form of a plurality of prisms, such as a rectangular prism or a cubic prism. As defined herein a "prism" is a solid body having two congruent parallel faces, where any cross section parallel to those faces is congruent to them. A "rectangular prism" is a solid object that has six faces that are rectangular in shape and a "cubic prism" is a solid object that has six faces that have a square cross-sectional shape.

As illustrated in FIGS. 2A, 2B and 4A to 4C, the base portion 22 comprises a base height 42 that extends parallel to longitudinal axis A-A, a base width 44 (FIG. 4B) that extends perpendicular to longitudinal axis A-A. In a preferred embodiment, the base height 42 may range from about 1 mm to about 200 mm, the base width 44 may range from about 1 mm to about 200 mm. In the case where the base portion 22 is constructed in the form of a prism, such as a rectangular or cubic prism, the base portion 22 has a base depth that ranges from 1 mm to about 100 mm that extends perpendicular to the base width 44.

Furthermore, the base body 32 may be constructed having a plurality of non-limiting cross-sectional shapes that extend perpendicular to longitudinal axis A-A. Examples of these cross-sectional shapes include, but are not limited to, a rectangle, a square, a triangle, a hexagon, an octagon, a curved shape or other polygon shapes.

The electrode base portion 22 is preferably composed of an electrically conductive electrode base first material such as a metal or metallic alloy. Non-limiting examples of electrically conductive base first materials include, but are not limited to, copper, aluminum, stainless steel, gold, silver, palladium, and alloys thereof.

In a preferred embodiment, the electrode tip portion 24 comprises an electrode tip body 48 having an electrode tip proximal end 50 with an electrode tip proximal end surface 52 (FIGS. 2A and 3A) that extends along longitudinal axis A-A to an electrode tip distal end 54 having an electrode tip distal end surface 56. In a preferred embodiment, the respective electrode tip proximal and distal end surfaces 52, 56 may extend perpendicularly with respect to longitudinal axis A-A. However, it is contemplated that either or both of the electrode tip proximal and distal end surfaces 52, 56 may be oriented at an angular relationship with respect to longitudinal axis A-A and lateral axis B-B. For example, either of the surfaces may be oriented from about 25° to about 60° with respect to longitudinal axis A-A and lateral axis B-B.

Similar to the base body 32, the electrode tip body 48 may be constructed of a plurality of unlimited shapes and sizes as illustrated in FIGS. 2A, 2B and 3A to 3E. In an embodiment shown in FIGS. 2A, 2B and 3A to 3D, the electrode tip body 48 may be constructed having opposed first and second major sidewalls 58, 60 that extend and meet opposed third and fourth major sidewalls 62, 64. In a preferred embodiment, as shown in FIGS. 3A to 3D, the opposed first and second major sidewalls 58, 60 are positioned about perpendicular to the opposed third and fourth major sidewalls 62, 64. In other words, the electrode tip portion 24 may be constructed in the form of a prism such as a rectangular prism or a cubic prism as previously described.

As shown in FIG. 3B, the electrode tip portion 24 comprises an electrode tip height 66 that extends between the proximal and distal electrode tip ends 50, 54. The electrode tip portion 24 also comprises an electrode tip width 68 that preferably extends perpendicular to the electrode tip height 66 and between the third and fourth major side walls 62, 64. In addition, the electrode tip portion 24 comprises an electrode tip depth 70 that extends perpendicularly between the opposed first and second sidewalls 58, 60. In a preferred embodiment, the electrode tip height 66 may range from about 1 mm to about 200 mm. The electrode tip width 68 may range from about 1 mm to about 100 mm and the electrode tip depth 70 may range from about 0.5 mm to about 50 mm.

In a preferred embodiment as illustrated in FIGS. 2A, 2B, 3B and 3C, the electrode tip body 48 may comprise an electrode tip groove 72. The groove 72 is designed to hold the workpiece prior to and during welding. In addition, the groove 72 is designed to increase the surface area that contacts the workpiece such that heat from the electrode is concentrated at the workpiece. The groove 72 preferably comprises a groove depth 74 that penetrates the electrode tip distal end surface 56 and extends at least partially through the electrode tip height 66.

As shown, the groove 72 preferably comprises a groove length 76 (FIG. 3B) that at least partially extends across the electrode tip distal end surface 56 perpendicular to longitudinal axis A-A. As shown in FIGS. 2A, 2B, 3B and 3C, the groove length 76 is preferably oriented about perpendicular to the opposed first and second major sidewalls 58, 60. However, it is contemplated that the length 76 of the groove 72 may be oriented such that it extends at an askew orientation with respect to either the first or second major sidewalls 58, 60. In a preferred embodiment, the groove depth 74 may range from about 0.1 mm to about 10 mm or from about 1 percent to about 90 percent of the height 66 of the electrode tip portion 24. In a preferred embodiment, the electrode tip height 66 may be constructed to be about 5 times that of the depth 74 of the groove 72. Furthermore, the groove length 76 may range from about 0.1 mm to about 100 mm or alternatively, from about 5 percent to about 100 percent, or about the full span of the depth 70 of the electrode tip portion 24. In addition, the groove 72 comprises a groove width 78 that ranges from about 0.1 mm to about 50 mm. Alternatively, the groove width 78 may extend from about 5 percent to about 90 percent of the width 68 of the electrode tip portion 24.

In a preferred embodiment, as shown in FIGS. 2A, 2B, and 4A-4C, the electrode tip groove 72 may comprise a cross-sectional shape oriented perpendicular to longitudinal axis A-A, in the shape of the letter "V". As shown in this particular example, the groove 72 comprises first and second groove sides 80, 82 (FIG. 4A-4C) that extend and meet at a groove axis 84 (FIGS. 2A, 2B) that extends perpendicular to longitudinal axis A-A. In a preferred embodiment, each of the first and second groove sides 80, 82 is positioned at an angular orientation from the distal end surface 56. In a preferred embodiment, either of the first or second groove sides 80, 82 may be oriented at an angle that ranges from about 20° to about 60° with respect to the electrode tip distal end surface 56 and longitudinal axis A-A.

Alternatively, the tip groove 72 may have a curved cross-section that extends perpendicular to the longitudinal axis A-A within the electrode tip distal end surface 56 and longitudinal axis A-A. In this particular example, the groove 72 may comprise a groove radius of curvature 85 having a point of origin 86 positioned parallel to the electrode tip distal end surface 56. In a preferred embodiment, the groove radius of curvature 85 may range from about 0.1 mm to about 50 mm. Other non-limiting shapes that the groove cross-section may comprise include a rectangle, a square, a triangle, or a hexagon.

FIG. 3A illustrates an example of the electrode tip body 48 in which the major sidewalls 58, 60, 62, 64 comprise planar surfaces and the first and second major sidewalls 58, 60 as well as the third and fourth major sidewalls 62, 64 meet at about 90° with respect to each other. FIG. 3B illustrates an example of the electrode tip body 48 comprising a groove 72 having a rectangular cross-section that extends perpendicular to longitudinal axis A-A. FIG. 3C shows an example of the electrode tip body 48 with a groove 72 having a curved cross-section. These various electrode tip groove 72 embodiments help correctly position the workpiece while the welding operation is performed. For example, groove 72 comprising a rectangular cross-section may be better suited to position a workpiece having a rectangular cross-section whereas a groove 72 having a curved cross-section may be better suited to hold a workpiece having a curved cross-section.

FIG. 3D illustrates an example of the electrode tip body 48 comprising a step 88 that extends upwardly from the distal end surface 56. In this particular embodiment, the step 88 acts as a platform for the workpiece and also acts to concentrate the energy, i.e., thermal and electrical energy to the workpiece. FIG. 3E illustrates an example of an electrode tip body 48 comprising a cylinder having an electrode tip radius 90.

Figure 1A:
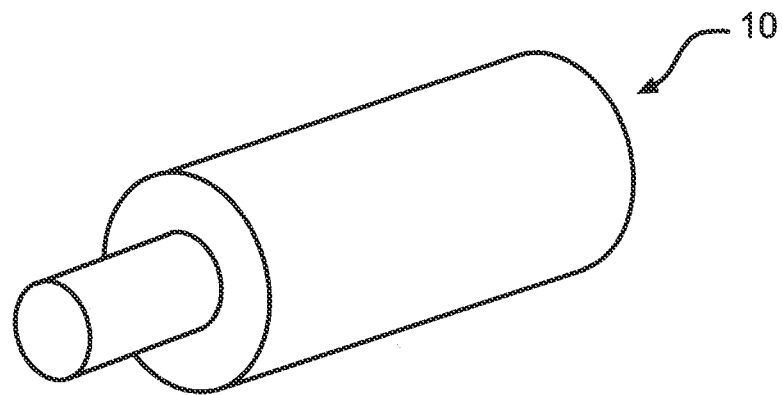
FIGS. 1A and 1B illustrate prior art embodiments of resistance welding electrodes having a uni-body construction.
Figure 1B:
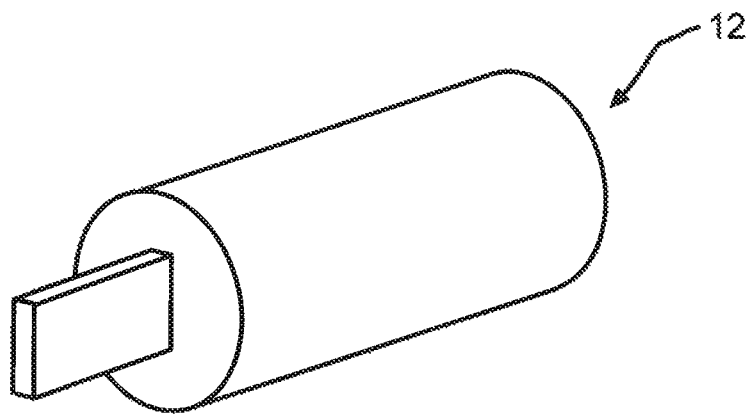

As previously mentioned and illustrated in FIGS. 2A and 2B, the electrode tip portion 24 preferably resides at the distal end 28 of the base portion 22 of the electrode 20. More specifically, the proximal end surface 52 of the electrode tip portion 24 is electrically contactable to the distal end surface 36 of the electrode base 22 such that electrical and thermal energy conducted by the base portion 22 can be readily transferred to the electrode tip portion 24. Furthermore, the electrode tip body 48 is physically contactable to the electrode base 22 such that it can be easily removed. Thus, by only removing the electrode tip portion 24, and not the whole electrode, as is the case with prior art electrodes 10, 12 such as those illustrated in FIG. 1, from the electrode base 22, welding process time can be significantly decreased. Since the electrode base portion 22 remains in the welding fixture 30 (FIG. 5), the fixture not need to be opened and closed to allow for the removal of the worn electrode and the subsequent installment of a new electrode, as is the case with the prior art electrodes 10, 12 comprising a "uni-body" construction. Therefore, when the electrode tip portion 24 of the present invention becomes worn through use, it is simply swapped out for a new electrode tip 24. Furthermore, there is no need to redress the electrode as is also the case with the prior art electrodes 10, 12. As used herein "redress" is defined as to sharpen and/or remove melted or partially melted electrode material from the electrode tip. Prior art resistance electrodes are typically redressed by rubbing a cloth or piece of sand paper against the electrode tip to remove debris and reshape the electrode tip. Therefore, the ability of the electrode tip portion 24 to be readily removed from the base portion 22 significantly reduces weld processing time. This is especially advantageous when performing a series of repetitive welds. In addition, since only the electrode tip portion 24 is removed, and not the whole electrode 10, 12, electrode material costs are significantly reduced.

The electrode tip body 48 is preferably composed of an electrically conductive electrode tip second material such as a metal or metallic alloy. Non-limiting examples of electrically conductive electrode tip second metals include, but are not limited to, copper, aluminum, stainless steel, gold, silver, palladium, and alloys thereof. In a preferred embodiment, the electrode tip portion 24 may be constructed of a second material having a greater melting temperature than the electrode base first material. Examples of these electrode tip second materials include but are not limited to molybdenum, tungsten, tantalum, cobalt, nickel, niobium, rhenium and mixtures thereof. Therefore, the electrode 20 of the present invention may be constructed having the base portion 22 constructed of copper, which has a relatively high electrical and thermal conductivity, and the separate electrode tip portion 24 may be composed of a refractory material, such as molybdenum, having a melting temperature that is significantly greater than the melting temperature of the electrode base first material. In a preferred embodiment, the electrode tip portion 24 may be constructed of an electrode tip second metal that comprises a melting temperature that is as much as 200° C. to 1,000° C. or greater than the base electrode first metal that comprises the base electrode portion 22. In addition, the electrode tip second material may be of the same or substantially similar composition, such as an alloy thereof, as the workpiece. In a preferred embodiment, the electrode tip second material may be composed of the same or substantially similar composition as at least one of the first and second workpiece metals. In a more preferred embodiment, the electrode tip second metal may be composed of the same or substantially similar metal as the workpiece metal with the lowest melting temperature. As defined herein "workpiece" is the metals intended to be welded and joined together. A "workpiece metal" is therefore one of the at least two metals that are intended to be welded and joined together.

FIGS. 4A-4C illustrate cross-sectional views of various embodiments in which the electrode tip portion 24 is positioned in physical contact with the electrode base portion 22. As illustrated in FIG. 4A, the electrode tip portion 24 may be positioned on the electrode base portion 22. More specifically, the electrode tip proximal end surface 52 is positioned in physical contact with the electrode base distal end surface 36. In a preferred embodiment, the cross-sectional surface area of the electrode tip proximal end surface 52 may be less than the cross-sectional surface area of the electrode base distal end surface 36. Alternatively, the cross-sectional surface area of the electrode tip proximal end surface 52 may be about the same or greater than the cross-sectional surface area of the electrode base distal end surface 36.

FIGS. 4B and 4C illustrate embodiments in which the electrode tip portion 24 is mated to the electrode base portion 22. More specifically, as illustrated in FIG. 4B, the electrode tip portion 24 is mated to the electrode base portion 22 with a ridge and slot feature. As shown, a ridge 92 extends outwardly from the electrode tip proximal end surface 52 and is configured to mate with a corresponding electrode base slot 94. Specifically, as shown, the ridge 92 extends along the electrode proximal end surface 34 in a perpendicular orientation with respect to longitudinal axis A-A. In a preferred embodiment, the ridge 92 is designed to be received in the corresponding electrode base slot 94 that extends at least partially within the electrode base distal end surface 36. The base slot 94 is preferably dimensioned such that the ridge 92 fits therewithin.

Furthermore, illustrated in the embodiment of FIG. 4B, is a terminal pin 119 and a tab portion 121 of a current collector of an electrochemical cell. More specifically, the terminal pin 119 is shown positioned within the electrode tip groove 72 and the tab portion 121 is positioned above the terminal pin 119. Thus, the electrode tip groove 72 is preferably dimensioned to hold a terminal pin 119 of an electrochemical cell while a tab portion 121 of a current collector is positioned in contact therewith.

FIG. 4C illustrates an embodiment in which the electrode tip portion ridge 92 further comprises opposed left and right flanges 96A, 96B that extend outwardly from the respective left and right sides of the ridge 92. In a preferred embodiment, these flanges 96A, 96B provide additional stability that secures the electrode tip portion 24 therewithin when mated with the base portion 22. To secure the electrode tip portion 24 (shown in FIG. 4C) to the base 22, the electrode tip 24 is preferably slid in a linear direction perpendicularly to longitudinal axis A-A such that it securely mates with the base 22. To remove the electrode tip portion, the tip 24 is again slid forwards or backwards perpendicular to longitudinal axis A-A, until the ridge 92 and/or flanges 96A, 96B become disengaged from the base portion slot 94. The embodiment illustrated in FIG. 4C is particularly beneficial when the electrode 20 is positioned in a vertical orientation such as when the electrode comprises the top electrode in the fixture 30. The flanged portions 96A, 96B of the electrode tip 92 prevent the tip portion 24 from becoming disengaged from the base 22, particularly when the electrode 20 is oriented in an upside down orientation with the electrode tip distal surface 56 pointing in a downward direction towards the ground. It is noted that while the electrode tip 24 of the embodiment shown in FIGS. 2A and 2B is illustrated, the electrode tip portion 24 may comprise either of the electrode tip portions 24 shown in FIGS. 3A-3E. In a preferred embodiment, the ridge 92 and corresponding base electrode slot 94 in which the ridge 92 is received and mates therewithin, may comprise a variety of non-limiting cross-sectional shapes which include, but are not limited to, a rectangle, a square, a triangle, a pentagon, a hexagon, an oval, a polygon or curved shaped.

FIG. 5 illustrates an embodiment of a welding station 98 that may be used with the electrode 20 of the present invention. As shown, the station 98 comprises the welding fixture 30 comprising a rod 100 and a clamp 102 that holds the electrode 20 therewithin. In addition, a second or upper electrode 104, which may or may not comprise the electrode 20 of the present invention, is illustrated as positioned above and opposed from a first or lower resistance electrode illustrated as the electrode 20 of the present invention. In a preferred embodiment, the clamp 102 of the welding fixture 30 is designed to hold the base portion 22 of the electrode 20 within the fixture 30. More specifically, the clamp 102 may be used to hold the electrode base portion 22 against a fixture wall 106 illustrated in FIG. 5.

An electrical power supply 108 is preferably electrically connected to the electrode 20 of the present invention and the opposed second electrode 104. In a preferred embodiment, a positive terminal 110 or a negative terminal 112 of the power source 108 may be electrically connected to either the electrode base portion 22 of the electrode of the present invention 20 or to the second electrode 104. The other of the positive or negative terminals is preferably connected to the other of the electrode base portion 22 or the second electrode 104.

Alternatively, as illustrated in FIGS. 5 and 5A, the electrode tip portion 24 may comprise an electrode tip bar 114 having an elongated tip bar length 116. A plurality of electrode tip bar grooves 118 preferably extend at least partially within a distal surface of the electrode tip bar 114. In a preferred embodiment, each of the electrode tip grooves 118 defines an electrode tip segment 120. The workpiece to be welded is preferably positioned within one of the series of grooves 118 that comprise the electrode tip bar segment 120.

In a preferred embodiment, the distal end of the second top electrode 104 makes contact with the workpiece(s) positioned within the groove 118 of the electrode tip bar 114 and a weld connection between the workpieces is made. As illustrated in the embodiment of FIG. 5, a terminal pin 119 and a tab portion 121 of a current collector of an electrochemical cell are shown positioned between the upper 104 and lower 20 electrodes. More specifically, the terminal pin 119 is illustrated positioned within the electrode tip bar groove 118 and the tab portion 121 is positioned above and in contact with the terminal pin 119. Thus, when the second top electrode 104 and the electrode tip bar 114 of the resistive welding electrode 20 of the present invention come together, and make contact with the respective terminal lead 119 and current collector tab 121, a weld bond is created therebetween.

Alternatively, the second top resistance welding electrode 104 makes contact with the workpiece positioned in the electrode groove 72 of the electrode tip portion 24. After the weld connection has been made, the weld tip bar 114 is advanced to an adjacent groove position in an adjacent weld tip bar segment 120 and a second weld is completed. In a preferred embodiment, the electrode tip portion 24 is sequentially indexed to each of the groove positions or segments, at which a weld connection is made. This indexing may be performed manually or be mechanized automatically by a machine. For example, movement of the welding fixture 30 may be controlled by a machine in which the electrode tip bar is automatically moved to the next position after a certain number of welds are made in a segment 120 or after the electrode tip is worn to a specific dimension.

In practice, at least two first and second metals as workpieces comprising similar or dissimilar melting temperatures are placed between the opposing lower and upper welding electrodes 20, 104 to create a bond therebetween. In a preferred embodiment, the first and second metals of the workpiece may have a difference in melting temperature that is greater than 125° C., more preferably greater than 250° C. and most preferably greater than 500° C. Examples of first workpiece metals include, but are not limited to, aluminum (melting temperature 660° C.), titanium (melting temperature 1,725° C.), nickel (melting temperature 1,453° C.), steel (melting temperature 1,130° C.), stainless steel (melting temperature 1,353° C.), niobium (melting temperature 2,468° C.), copper (melting temperature 1,083° C.), gold (melting temperature 1,064° C.), silver (melting temperature 961° C.), palladium (melting temperature 1,554° C.), and combinations thereof. Examples of second workpiece metals include, but are not limited to, molybdenum (melting temperature 2,617° C.), tantalum (melting temperature 2,996° C.), tungsten (melting temperature 3,410° C.), and combinations thereof.

In a preferred embodiment, a current is applied to the first and second workpiece metals between the top welding electrode 104 and the bottom welding electrode 20. In a preferred embodiment, a current preferably greater than 800 amperes is preferably applied to at least the first and second workpieces for about one to ten milliseconds. If desired, a force of between about 10 to about 50 Newtons may also be applied to the workpieces. In this embodiment, the current is applied between the two welding electrodes 20, 104 while the force is applied to the top welding electrode 104 pressing the workpieces. Alternatively, the force could also be applied to the bottom welding electrode 20 pushing upwards towards the workpieces or applied equally between both welding electrodes 20, 104. The application of the current combined with the force forms a strong bond between the first and second workpieces within a few milliseconds. It is noted however, that while joining two workpieces (a first and second workpiece metal) is preferred, an additional number of metals comprising those discussed in the present application may also be joined together. Additionally, it is noted that while it is preferred that the resistance welding electrode 20 of the present invention may be positioned in the lower of the two (lower and upper) opposed welding electrode positions, it is contemplated that the electrode 20 of the present invention may comprise the upper or both upper and lower electrode positions in the welding fixture 30.

FIG. 5A illustrates a perspective view of an embodiment of the electrode tip bar 114 illustrated in FIG. 5. As shown, the electrode tip bar 114 comprises an elongated length 116 with a rectangular cross section that extends perpendicular to the length. In addition, a series of discrete grooves 118 extend at least partially within a portion of the distal end surface perpendicular to its longitudinal length 116. It is further contemplated that one or more of the electrode tip portions 24 embodied in FIGS. 3A-3E may comprise at least one segment 120 of the electrode tip bar 114 illustrated in FIGS. 5 and 5A. As illustrated, a segment 120 comprises an electrode tip bar groove 118. In addition, each segment 120 is preferably spaced apart from each other.

Figure 6:
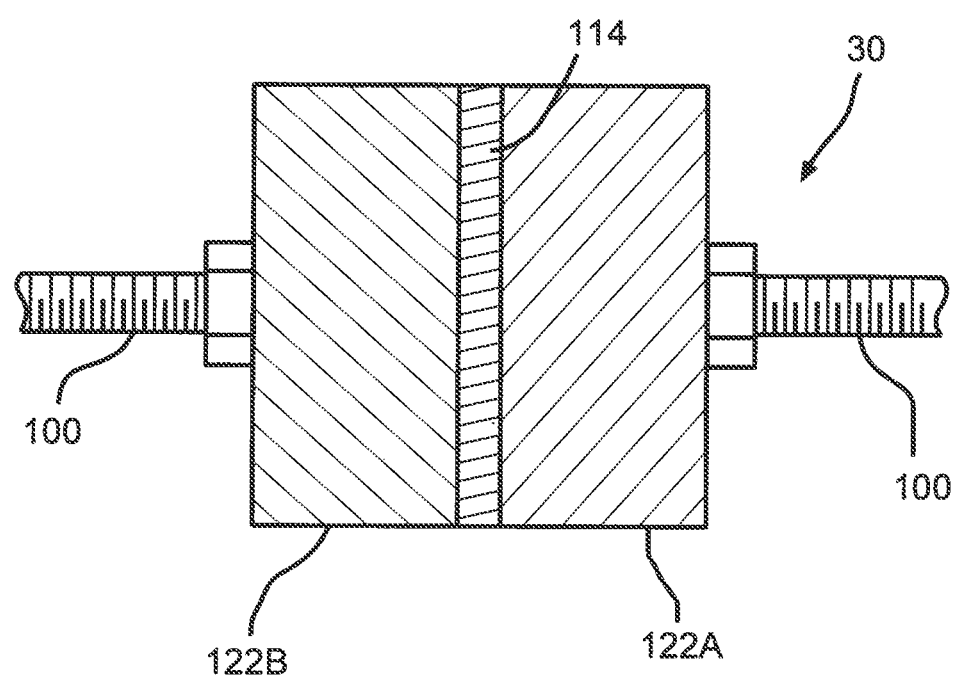
FIG. 6 is a cross-sectional view of an alternative embodiment of a welding fixture which may use the electrode tip portions illustrated in FIGS. 3A-3E and 5A.

FIG. 6 illustrates a cross-sectional view of an alternate electrode embodiment in which the electrode tip bar 114 or electrode tip portion 24 is sandwiched between a first electrode base portion 122A and an opposed second electrode base portion 122B. As shown, the electrode bar 114 is compressed between the first and second electrode base portions 122A, 122B by two opposed electrode fixture rams 100.

Now, it is therefore apparent that the present invention has many features among which are reduced manufacturing cost and construction complexity. While embodiments of the present invention have been described in detail, that is for the purpose of illustration, not limitation.

What is claimed is:

1. A welding electrode, comprising:
   a) a base comprised of a first electrically conductive material, wherein the base comprises a base sidewall extending from a base proximal end to a base distal end;
   b) an electrode bar comprising molybdenum, wherein the electrode bar comprising molybdenum is removably connected to the base and comprises an electrode bar sidewall having a height extending from an electrode bar proximal end to an electrode bar distal end; and
   c) a plurality of grooves spaced along the electrode bar comprising molybdenum, each groove extending inwardly from the electrode bar distal end part-way through the electrode bar height toward the electrode bar proximal end, wherein each groove:
      i) resides between spaced apart first and second planar portions of the electrode bar distal end, and
      ii) extends to opposed open groove ends at spaced apart locations at the electrode bar sidewall, and
   d) wherein the base is configured for electrical connection to an electrical power supply, and when the base is connected to the electrode bar comprising molybdenum, the electrode bar comprising molybdenum is conductively connected to the base.

2. The resistance welding electrode of claim 1, wherein each of the plurality of grooves extends along a groove length that is aligned perpendicular to a longitudinal axis of the electrodes bar comprising molybdenum.

3. The welding electrode of claim 1, wherein the electrode bar comprising molybdenum has an outwardly extending ridge that extends to opposed ridge ends at spaced apart locations on the electrode bar sidewall, and wherein the base comprises an inwardly extending slot that extends to opposed slot ends at spaced apart locations on the base sidewall, and wherein the base is manipulatable with respect to the electrode bar comprising molybdenum so that the ridge is mateable with the slot to thereby effect the removable connection of the electrode bar comprising molybdenum to the base.

4. The welding electrode of claim 1, wherein each of the plurality of grooves has a respective cross-sectional shape extending to the opposed open groove ends at spaced apart locations at the electrode bar sidewall, the respective cross-sectional shape being selected from the group consisting of a "V", a "U", a rectangle, a square, a hexagon, and a radiused curve.

5. The welding electrode of claim 1, wherein the first electrically conductive material of the base is selected from the group consisting of copper, aluminum, stainless steel, gold, silver, palladium, alloys, and mixtures thereof.

6. The welding electrode of claim 1, wherein the electrode bar comprising molybdenum has a melting temperature that is at least 1,000° C. greater than that of the first electrically conductive material of the base.

7. The welding electrode of claim 1, wherein the opposed open groove ends of each groove are diametrically opposite each other at the electrode bar sidewall.

8. The welding electrode of claim 1, wherein the base comprises copper.

9. The welding electrode of claim 1, wherein the base comprises copper.

10. The welding electrode of claim 3, wherein one of the outwardly extending ridge of the electrode bar comprising molybdenum and the inwardly extending slot of the base has a cross-sectional shape that is selected from the group consisting of a "V", a "U", a rectangle, a square, a hexagon, and a radiused curve, and wherein the other of the electrode bar ridge and base slot has a mateable shape to effect the removable connection of the electrode bar comprising molybdenum to the base.

11. A welding electrode, comprising:
   a) a base comprised of a first electrically conductive material selected from the group consisting of copper, aluminum, stainless steel, gold, silver, palladium, alloys, and mixtures thereof;
   b) an electrode bar comprising molybdenum, wherein the electrode bar comprising molybdenum is removably connected to the base and comprises a sidewall having a height extending from an electrode bar proximal end to an electrode bar distal end; and
   c) a plurality of V-shaped grooves spaced along the electrode bar comprising molybdenum, each V-shaped groove extending inwardly from the electrode bar distal end part-way through the electrode bar height toward the electrode bar proximal end, wherein each V-shaped groove:
      i) resides between spaced apart first and second planar portions of the electrode bar distal end, and
      ii) extends to opposed open groove ends at spaced apart location at the electrode bar sidewall, and
   d) wherein the base is configured for electrical connection to an electrical power supply, and when the base is connected to the electrode bar comprising molybdenum, the electrode bar comprising molybdenum is conductively connected to the base.

12. The welding electrode of claim 11, wherein each of the plurality of V-shaped grooves extends along a groove length that is aligned perpendicular to a longitudinal axis of the electrode bar comprising molybdenum.

13. The welding electrode of claim 11, wherein the opposed open groove ends of each V-shaped groove are diametrically opposite each other at the electrode bar sidewall.

14. The welding electrode of claim 11, wherein the electrode bar comprising molybdenum has an outwardly extending ridge that extends to opposed ridge ends at spaced apart locations on the electrode bar sidewall, and
wherein the base comprises an inwardly extending slot that extends to opposed slot ends at spaced apart locations on the base sidewall, and
wherein the base is manipulatable with respect to the electrode bar comprising molybdenum so that the ridge is mateable with the slot to thereby effect the removable connection of the electrode bar comprising molybdenum to the base.

15. The welding electrode of claim 14, wherein one of the outwardly extending ridge of the electrode bar comprising molybdenum and the inwardly extending slot of the base has a cross-sectional shape that is selected from the group consisting of a "V", a "U", a rectangle, a square, a hexagon, and a radiused curve, and wherein the other of the electrode bar ridge and base slot has a mateable shape to effect the removable connection of the electrode bar comprising molybdenum to the above.

\* \* \* \* \*